(12) United States Patent
Lancieri

(10) Patent No.: US 8,284,319 B2
(45) Date of Patent: Oct. 9, 2012

(54) DEVICE AND METHOD FOR PROCESSING IMAGES TO DETERMINE A SIGNATURE OF A FILM

(75) Inventor: Luigi Lancieri, Evrecy (FR)

(73) Assignee: France Telecom, Paris (FR)

( * ) Notice: Subject to any disclaimer, the term of this patent is extended or adjusted under 35 U.S.C. 154(b) by 308 days.

(21) Appl. No.: 12/601,814

(22) PCT Filed: May 30, 2008

(86) PCT No.: PCT/FR2008/050960
§ 371 (c)(1),
(2), (4) Date: Nov. 24, 2009

(87) PCT Pub. No.: WO2008/149047
PCT Pub. Date: Dec. 11, 2008

(65) Prior Publication Data
US 2010/0166254 A1      Jul. 1, 2010

(30) Foreign Application Priority Data

May 30, 2007  (FR) ...................................... 07 55331

(51) Int. Cl.
*H04N 5/14* (2006.01)

(52) U.S. Cl. ........................... 348/700; 709/230; 714/39
(58) Field of Classification Search .................. 348/700; H04N 9/64
See application file for complete search history.

(56) References Cited

U.S. PATENT DOCUMENTS

| | | | |
|---|---|---|---|
| 6,658,056 B1 * | 12/2003 | Duruoz et al. | 375/240 |
| 7,949,186 B2 * | 5/2011 | Grauman et al. | 382/170 |
| 2004/0139212 A1 * | 7/2004 | Mukherjee et al. | 709/230 |
| 2005/0125710 A1 * | 6/2005 | Sanghvi | 714/39 |

* cited by examiner

*Primary Examiner* — Dave Czekaj
*Assistant Examiner* — Tracy Li
(74) *Attorney, Agent, or Firm* — Cozen O'Connor

(57) ABSTRACT

A method of processing images to determine at least one signature of a film. The method includes a step of selecting chronologically a series of images from said film, a step of evaluating shifts relating to at least one descriptor corresponding to a physical property between consecutive images in order to obtain primary visual shifts, a step of calculating differences between said primary visual shifts to determine secondary visual shifts, a step of calculating differences between said secondary visual shifts to determine tertiary visual shifts, and a step of determining a mean value and a standard deviation of the primary, secondary, and tertiary visual shifts to obtain the signature of the film.

11 Claims, 1 Drawing Sheet

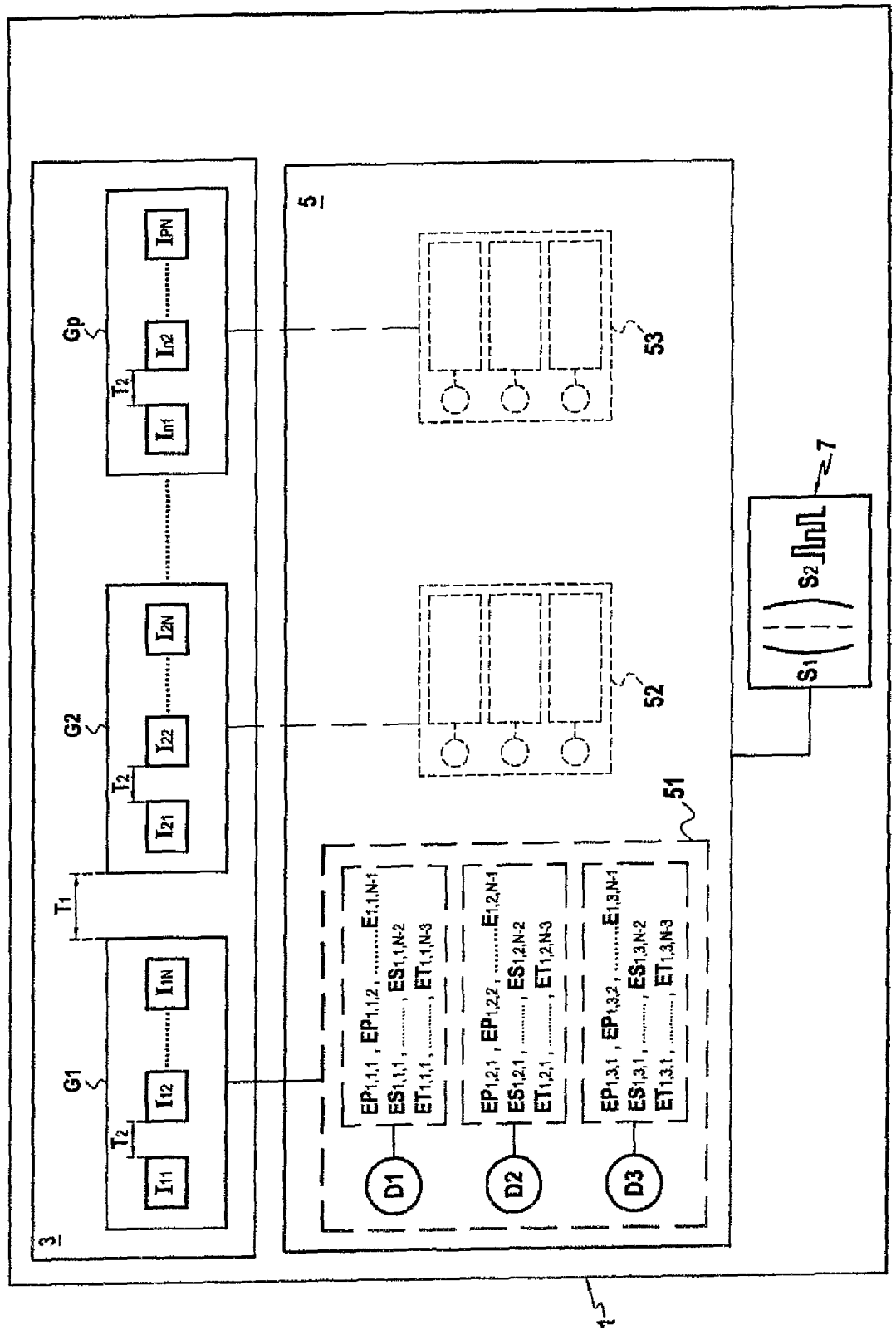

DEVICE AND METHOD FOR PROCESSING IMAGES TO DETERMINE A SIGNATURE OF A FILM

RELATED APPLICATIONS

This is a U.S. National Phase Application under 35 USC §371 of International Application PCT/FR2008/050960, filed on May 30, 2008.

This application claims the priority of French application no. 0755331 filed on May 30, 2007, the content of which is hereby incorporated by reference.

TECHNICAL FIELD OF THE INVENTION

The invention relates to the field of image processing. To be more precise, the invention relates to the use of image processing, in particular video sequence processing, to determine a signature of an animated visual document, for example a film or a video, regardless of the format and the type of coding (digital, mpeg, divx, etc.).

BACKGROUND OF THE INVENTION

To obtain a characteristic representative of the visual rhythm of a video, known methods use local semantic properties. These properties include, for example, the identification of shots, scenes or movements of objects, embedding of text, and recognition of shapes or faces.

The main tasks of video indexing rely either on a description of the whole of the document or on detecting breaks or discontinuities in the film. These discontinuities can relate to movement, color, etc. That approach imposes running through the entire film on the look out for these discontinuities, which is costly and very time-consuming.

Another aspect of the usual techniques that is very costly in terms of resources is identifying and choosing key images in each shot. The key images are defined as the most significant images.

Accordingly, those techniques seek to identify object trajectories, text, functions of characters via their costume, face recognition, movements of the human body, etc. For example, a video is identified as relating to sport if movements of balls or players are captured. Relevant to those techniques are local descriptors that have a meaning (ball, players, etc.).

In contrast to those techniques there are also fast, statistically based methods such as macrosegmentation that take into account the statistical characteristics of the signal, for example audio or video data of very low level.

For example, the document concerning analysis of the rhythm of a film by B. Ionescu et al. entitled "Analyse et caractérisation de séquences de films d'animation" [Analysis and characterization of animated film sequences] (Orasis 2005) describes a technique that calculates mean values and shifts between different shots of a film. However, that method uses shots spaced by several tens of seconds and detection in that situation requires a very complex algorithm.

SUMMARY OF THE INVENTION

One aspect of the present invention is directed to a method of processing images to determine at least one signature of a film, this method including a step of selecting chronologically a series of images from said film, a step of evaluating shifts relating to at least one descriptor corresponding to a physical property between consecutive images in order to obtain primary visual shifts, a step of calculating differences between said primary visual shifts to determine secondary visual shifts, a step of calculating differences between said secondary visual shifts to determine tertiary visual shifts, and a step of determining a mean value and a standard deviation of the primary, secondary, and tertiary visual shifts to obtain the signature of the film.

Thus statistical sampling based solely on a temporal criterion is applied to visual discontinuities between the images to obtain simply and quickly a characteristic representative of the visual rhythm of the film. Limited sampling can suffice, given that a film has a high level of internal consistency. Furthermore, the first signature characterizes the film in a synthetic and global manner.

According to one embodiment of the present invention, the series of images includes a particular number P of groups of images at a predetermined rate of coverage of the film, each group of images including a predetermined number N of images.

The film can therefore be segmented simply and quickly without reference to key images or shots.

According to another aspect of the present invention, for each group of N images, N primary visual shifts are evaluated, N−1 secondary visual shifts are calculated from said N primary visual shifts, N−2 tertiary visual shifts are calculated from the N−1 secondary visual shifts, and a mean value and a standard deviation of the primary, secondary, and tertiary visual shifts are determined from the N primary visual shifts, N−1 secondary visual shifts and N−2 tertiary visual shifts obtained for the P groups of images.

According to another aspect of the present invention, the groups of images are spaced by a first time shift and the images in each of the groups of images are spaced by a second time shift.

In a variant of the invention the first time shift is calculated for each film as a function of various parameters including the duration of the film and the required rate of coverage and the second time shift is predefined and applied identically to each film.

The selected images therefore cover the film in a relatively homogeneous manner, which simplifies sampling and improves the characterization of the film.

Said at least one descriptor corresponds to a luminance, movement, geometrical shape or color descriptor.

Thus to characterize the film precisely it suffices to exploit physical properties that are very simple to use.

For example, said at least one descriptor is chosen from the following descriptors:
- a luminance descriptor for calculating a primary visual shift between two consecutive images in each group of images from a ratio between the number of dark pixels and the number of light pixels in each image;
- a movement descriptor for calculating a primary visual shift corresponding to an overlapping of contours or dominant shapes between two successive images in each group of images; and
- an ambiance descriptor for calculating a primary visual shift corresponding to a variation of color between two consecutive images in each group of images.

These descriptors are very simple to use and can be processed statistically to determine the signature of the film simply and quickly.

Another aspect of the invention is directed to an image processing device for determining at least one signature of a film, the device being characterized in that it includes selection means for selecting chronologically a series of images from said film, evaluation means for evaluating shifts relative to at least one descriptor corresponding to a physical property between consecutive images in order to obtain primary visual shifts, calculation means for calculating differences between said primary visual shifts to determine secondary visual shifts, calculation means for calculating differences between said secondary visual shifts to determine tertiary visual shifts, and determination means for determining a mean value and a standard deviation of the primary, secondary, and tertiary visual shifts to obtain the signature of the film.

BRIEF DESCRIPTION OF THE SINGLE DRAWING

Other features and advantages of the invention emerge from a reading of the description given below by way of non-limiting example with reference to the single appended drawing, which is a diagrammatic view of an image processing device of the invention for determining a signature of a film.

DETAILED DESCRIPTION OF THE SINGLE DRAWING

The single FIGURE shows one example of an image processing device 1 of the invention for determining a signature of a film, including selection means 3, definition means 5, and processing means 7. Note that this FIGURE is also an illustration of the principal steps of the image processing method of the invention for determining a signature of a film.

The selection means 3 select chronologically a series of images $I_{11}, I_{12}, \ldots, I_{PN}$ from the film. The images are selected only with reference to time shifts $T_1, T_2$ and independently of shots, scenes or other subdivisions of the film. The definition means 5 define at least one descriptor $D_1, D_2, D_3$ for evaluating visual shifts $EP_{1,1,1}, \ldots, ES_{1,1,1}, \ldots, ET_{1,1,1}, \ldots, ET_{1,3,N-3}$ between these images $I_{11}, I_{12}, \ldots, I_{PN}$.

Finally, the processing means 7 statistically process the visual shifts associated with the descriptors $D_1, D_2, D_3$ to determine the signature $S_1, S_2$ of the film and its classification.

The time shifts $T_1, T_2$ between these images $I_{11}, I_{12}, \ldots, I_{PN}$ can therefore be considered as discontinuities in the events of the film. Statistical sampling of these discontinuities produces a more general characteristic representative of the visual rhythm of the film.

Segmenting the film into a series of images $I_{11}, I_{12}, \ldots, I_{PN}$ indexed to the chronology of the film can include a particular number P of groups $G_1, \ldots, G_P$ of images at a predetermined rate of coverage of the film. Moreover, each group of images can include a predetermined number N of images $I_{11}, I_{12}, \ldots, I_{PN}$. The groups of images $G_1, \ldots, G_P$ are spaced by a first time shift $T_1$ (in the example shown in the FIGURE, the first time shift $T_1$ is constant) and the images $I_{11}, I_{12}, \ldots, I_{PN}$ in each of the groups of images $G_1, \ldots, G_P$ are spaced by a second time shift $T_2$ (in the example shown in the FIGURE, the second time shift $T_2$ is constant). The first and/or second time shift $T_1, T_2$ is advantageously parameterable and can have a fixed basic duration for all of the film.

Note that the first time shift $T_1$ can be calculated for each film as a function of various parameters including the duration of the film and the required coverage rate and the second time shift $T_2$ can be predefined and applied to each film in exactly the same way.

For example, each group of images $G_1, \ldots, G_P$ can consist of four images (N=4) spaced by a first time shift $T_2$ that is relatively small (for example of the order of 500 ms).

Generally speaking, the number and the time shift $T_1$ of the various groups of images $G_1, \ldots, G_P$ can be chosen so that those groups are preferably (although not necessarily) equally distributed with a certain rate of coverage of the film. For example, for a film that lasts one hour, if each group of images $G_1, \ldots, G_P$ occupies three seconds and a coverage rate of 10% is required then 120 groups of images $G_1, \ldots, G_{120}$ (P=120) are extracted, separated by 27 seconds (first time shift $T_1$=27 s). Thus the first time shift $T_1$ corresponds to an equal distribution duration that covers the film relatively homogeneously.

Note that each group of images $G_1, \ldots, G_P$ is subjected to identical processing to extract a series of characteristics of each of the groups of images. The characteristics or descriptors $D_1, D_2, D_3$ extracted from a group of images are analyzed in terms of the differences between the images $I_{11}, I_{12}, \ldots, I_{PN}$ constituting the group. Each of the descriptors $D_1, D_2, D_3$ evaluates the shift in a physical property between two consecutive images $I_{11}, I_{12}$ of the group of images. Thus each descriptor evaluates for each group of images a particular number N−1 of primary visual shifts.

More particularly, the example shown in the FIGURE shows an evaluation of the visual shifts 51, 52, 53 for each of the groups and only the evaluation 51 for the first group $G_1$ is shown in more detail.

For example, for the group $G_1$, the descriptor $D_1$ evaluates N−1 primary visual shifts $EP_{1,1,1}, \ldots, EP_{1,1,N-1}$, the descriptor $D_2$ evaluates another N-1 primary visual shifts $EP_{1,2,1}, \ldots, EP_{1,2,N-1}$, and the descriptor $D_3$ evaluates a further N−1 primary visual shifts $EP_{1,3,1}, \ldots, EP_{1,3,N-1}$. Generally speaking, for a group $G_i$, a descriptor $D_k$ evaluates N−1 primary visual shift $EP_{i,k,1}, \ldots, EP_{i,k,N-1}$.

By way of example, the descriptor can correspond to a luminance descriptor $D_1$, a movement descriptor $D_2$, an ambiance or color descriptor $D_3$, a geometrical shape descriptor or any other type of descriptor. The luminance descriptor $D_1$ calculates a primary visual shift between two consecutive images in each group of images $G_1, \ldots, G_P$ from a ratio between the number of dark pixels and the number of light pixels in each image (for example $EP_{1,1,1}$ for the group $G_1$ and for the consecutive images $I_{11}, I_{12}$). The movement descriptor $D_2$ calculates a primary visual shift between two consecutive images in each group of images $G_1, \ldots, G_P$ from an overlap between dominant shapes or contours between two successive images of each group (for example $EP_{1,2,1}$ for the group $G_1$ and for the consecutive images $I_{11}, I_{12}$). Finally, the ambiance descriptor $D_3$ calculates a primary visual shift between two consecutive images in each group of images from a color variation (for example $EP_{1,3,1}$ for the group $G_1$ and for the consecutive images $I_{11}, I_{12}$).

Moreover, for statistical processing of the visual shifts, differences are calculated between the primary visual shifts (for example $EP_{1,1,1}, \ldots, EP_{1,1,N-1}$ for the group $G_1$ and the descriptor $D_1$) to determine a particular number N−2 of secondary visual shifts (for example $ES_{1,1,1}, \ldots, ES_{1,1,N-2}$ for the group $G_1$ and the descriptor $D_1$). Generally speaking, for a group $G_i$ and a descriptor $D_k$, N−2 secondary visual shifts $ES_{i,k,1}, \ldots, ES_{i,k,N-2}$ are calculated.

Differences are then calculated between the secondary visual shifts (for example $ES_{1,1,1}, \ldots, ES_{1,1,N-2}$ for the group $G_1$ and the descriptor $D_1$) to determine a particular number N−3 of tertiary visual shifts (for example $ET_{1,1,1}, \ldots, ET_{1,1,N-3}$ for the group $G_1$ and the descriptor $D_1$). Generally speaking, for a group $G_i$ and a descriptor $D_k$, N−3 tertiary visual shifts $ET_{i,k,1}, \ldots, ET_{i,k,N-3}$ are calculated.

For a synthetic and global characterization of the film, the mean value and the standard deviation of the primary, secondary and tertiary visual shifts associated with each descriptor $D_1$, $D_2$, $D_3$ are determined for all the groups of images $G_1, \ldots, G_P$ to obtain a first signature $S_1$ of the film.

Moreover, for an analytic characterization of the film, the primary, secondary or tertiary visual shifts associated with each descriptor $D_1$, $D_2$, $D_3$ are classified to obtain a second signature $S_2$ of the film.

Accordingly, in the example where each group of images is made up of four images $I_{11}$, $I_{12}$, $I_{13}$, $I_{14}$ (N=4 and P=1), three primary visual shifts are calculated for each group and for each descriptor $D_1$, $D_2$, $D_3$ (for example $EP_{1,1,1}$, $EP_{1,1,2}$, $EP_{1,1,3}$ for the group $G_1$ and the descriptor $D_1$). From these primary visual shifts, two secondary visual shifts are calculated for each group and for each descriptor (for example $ES_{1,1,1} = EP_{1,1,1} - EP_{1,1,2}$ and $ES_{1,1,2} = EP_{1,1,2} - EP_{1,1,3}$ for the group $G_1$ and the descriptor $D_1$). A tertiary visual shift is calculated in the same way for each group and for each descriptor from the two secondary visual shifts (for example $ET_{1,1,1} = ES_{1,1,1} - ES_{1,1,2}$ for the group $G_1$ and the descriptor $D_1$). Statistical processing of the primary, secondary and tertiary visual shifts models the speed and the acceleration of events in the film.

For example, if a film includes 100 groups $G_1, \ldots, G_{100}$, to obtain a highly synthetic signature there are calculated for each descriptor $D_k$ the mean and the standard deviation of all the 300 primary visual shifts $EP_{1,k,1}, \ldots, EP_{100,k,3}$ (3 shifts× 100 groups), the 200 secondary visual shifts $ES_{1,k,1}, \ldots, EP_{100,k,2}$ (2 shifts×100 groups), and the 100 tertiary visual shifts $EP_{100,k,1}$ (1 shift×100 groups). The film is therefore finally described for the three descriptors $D_1$, $D_2$, $D_3$ by a signature $S_1$ corresponding to a vector of 18 values comprising 9 mean values and 9 standard deviations.

Moreover, to obtain a more detailed signature, still in the example of a film including 100 groups $G_1, \ldots, G_{100}$, the distribution of the classes of the values of the shifts for each of the three descriptors $D_1$, $D_2$, $D_3$ is determined. Three histograms are determined for each descriptor. Thus, for a descriptor $D_1$, the distribution in classes or histograms $S_2$ of 300 primary visual shifts, 200 secondary visual shifts and 100 tertiary visual shifts are determined. The film can then be described by a set of 9 histograms (one for each pair comprising a descriptor (D1-D3) and a type of characteristic (primary, secondary, tertiary)).

Once calculated, the elements of the signatures $S_1$, $S_2$ can be either used as they are to compare two films or used with categorization algorithms to classify a large number of films.

For example, films from a database of films can be classified or searched on the basis of their signatures. More particularly, films having similar characteristics can be grouped by comparing them. In other words, a set of unknown films is entered and a set of categories including the films in each category is obtained.

Moreover, a certain film profile (for example action film) can be stored on the basis of a few examples of films known to be action films. This profile serves thereafter as a filter for identifying films close to this profile.

It is also possible to use learning techniques such as neural networks offering good performance in terms of detecting associations; for example, whether a film is an action film or a romantic film can be detected.

Accordingly, to determine the signature of a film in accordance with the present invention, only images selected chronologically are considered without reference to the shot, which is very quick to identify. The statistical sampling of events provides a systematic and simple algorithmic approach that economizes large quantities of processing resources. Moreover, the strong internal consistency of the films means that very limited sampling suffices.

Thus the present invention enables very fast indexing of videos. This enables indexing virtually in real time or on the fly (for example in a video stream) and the use of indexing in services offered on lightweight terminals (for example, multifunction smart phones) such as video searching, for example the VisualSEEk fully automated content-based image query system.

Note, moreover, that the image processing device 1 from the single FIGURE can be used by a data processing system conventionally comprising a central processor unit controlling by signals a memory, an input unit and an output unit interconnected by data buses.

Moreover, this data processing system can be used to execute a computer program including program code instructions for executing the image processing method of the invention.

The invention also provides a computer program product downloadable from a communications network and including program code instructions for executing the steps of the image processing method of the invention when it is executed on a computer. This computer program can be stored on a computer-readable medium and can be executed by a microprocessor.

This program can use any programming language and take the form of source code, object code or a code intermediate between source code and object code, such as a partially-compiled form, or any other desirable form.

The invention also provides a computer-readable information medium containing instructions of a computer program as referred to above.

The information medium can be any entity or device capable of storing the program. For example, the medium can include storage means, such as a ROM, for example a CD ROM or a microelectronic circuit ROM, or magnetic storage means, for example a floppy disk or a hard disk.

Moreover, the information medium can be a transmissible medium such as an electrical or optical signal, which can be routed via an electrical or optical cable, by radio or by other means. The program of the invention can in particular be downloaded over an Internet-type network.

The invention claimed is:

1. A method of processing images to determine at least one signature of a film, comprising the steps of:
    selecting chronologically a series of images from the film;
    obtaining primary visual shifts as shifts of at least one descriptor of a physical property between consecutive images of the series;
    calculating secondary visual shifts as differences between said primary visual shifts;
    calculating tertiary visual shifts as differences between said secondary visual shifts; and
    determining a signature of the film as a mean value and a standard deviation of the primary, secondary, and tertiary visual shifts.

2. The method according to claim 1, wherein the series of images includes a particular number P of groups of images at a predetermined rate of coverage of the film, each group of images including a predetermined number N of images.

3. The method according to claim 2, wherein:
    for each group of N images, N primary visual shifts are evaluated, N−1 secondary visual shifts are calculated from said N primary visual shifts, and N−2 tertiary visual shifts are calculated from the N−1 secondary visual shifts; and
    a mean value and a standard deviation of the primary, secondary, and tertiary visual shifts are determined from the N primary visual shifts, N−1 secondary visual shifts and N−2 tertiary visual shifts obtained for the P groups of images.

4. The method according to claim 2, wherein the groups of images are spaced by a first time shift and the images in each of the groups of images are spaced by a second time shift.

5. The method according to claim 4, wherein the first time shift is calculated for each film as a function of various parameters including a duration of the film and a required rate of coverage and the second time shift is predefined and applied independently of the film.

6. The method according to claim 1, wherein said at least one descriptor includes a luminance, a movement, a geometrical shape or a color descriptor.

7. The method according to claim 6, wherein said at least one descriptor is one of the following descriptors:
   a luminance descriptor for calculating a primary visual shift between two consecutive images in a group of images from a ratio between a number of dark pixels and a number of light pixels in each image of the group;
   a movement descriptor for calculating a primary visual shift corresponding to an overlapping of contours or dominant shapes between two successive images in the group of images; and
   an ambiance descriptor for calculating a primary visual shift corresponding to a variation of color between two consecutive images in the group of images.

8. An image processing device for determining at least one signature of a film, comprising:
   selection means, for selecting chronologically a series of images from said film;
   obtaining means for obtaining primary visual shifts as shifts of at least one descriptor of a physical property between consecutive images of the series;
   calculation means for calculating secondary visual shifts as differences between said primary visual shifts;
   calculation means for calculating tertiary visual shifts as differences between said secondary visual shifts; and
   determination means for determining a signature of the film as a mean value and a standard deviation of the primary, secondary, and tertiary visual shifts.

9. A computer program including program code instructions for executing the image processing method according to claim 1 when said program is loaded into and executed in a computer or a data processing system.

10. A non-transitory computer-readable information medium storing a computer program including instructions for executing the steps of the image processing method according to claim 1.

11. An image processing device for determining at least one signature of a film, the device being configured to:
   select chronologically a series of images from said film;
   obtain primary visual shifts as shifts of at least one descriptor of a physical property between consecutive images;
   calculate secondary visual shifts as differences between said primary visual shifts;
   calculate tertiary visual shifts as differences between said secondary visual shifts; and
   determine a signature of the film as a mean value and a standard deviation of the primary, secondary, and tertiary visual shifts.

* * * * *